Sept. 24, 1968          E. A. MALICK          3,403,029
RECONSTITUTED BEER PROCESS USING FRACTIONAL CRYSTALLIZATION
Filed Nov. 6, 1964
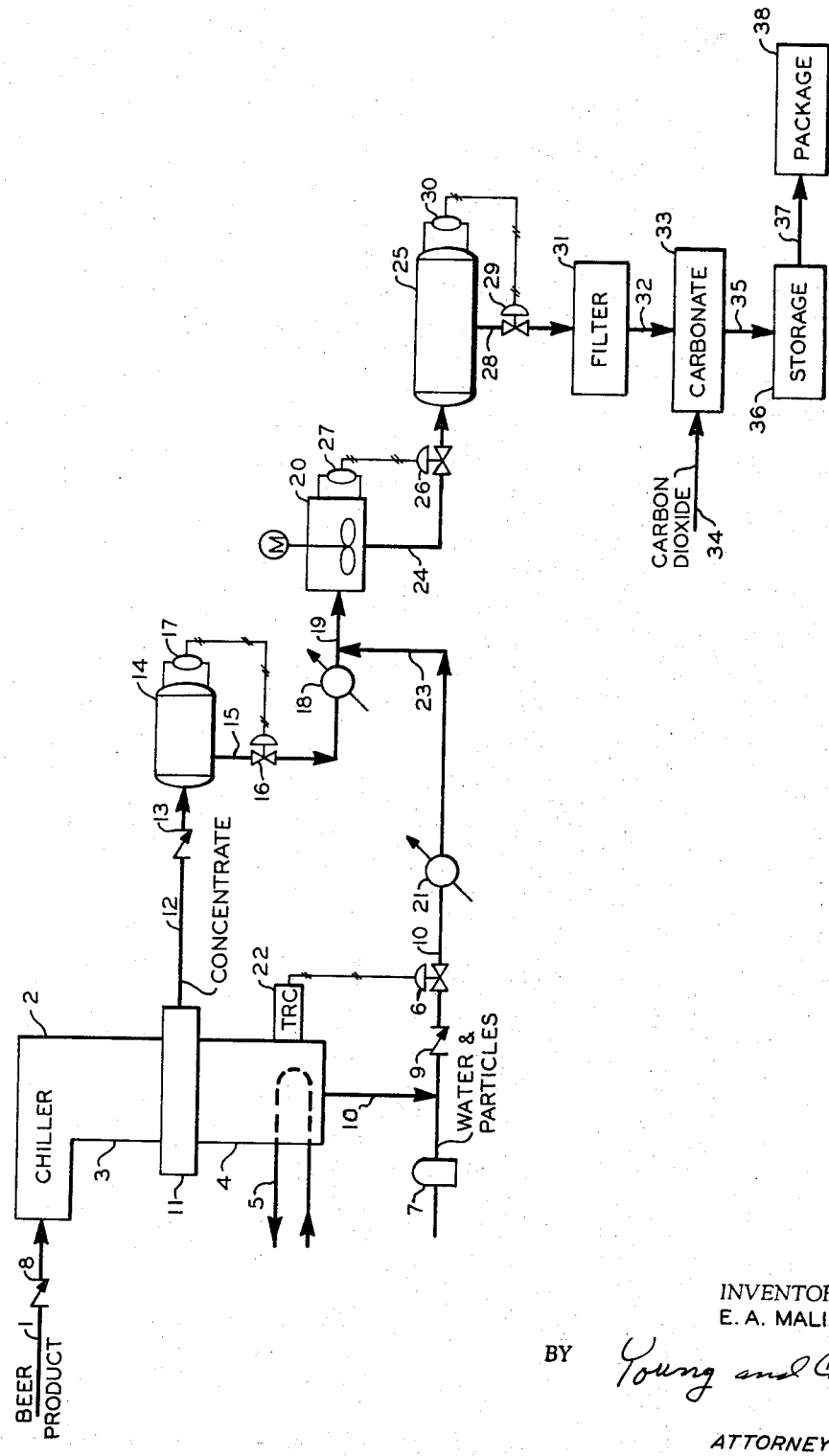
INVENTOR.
E. A. MALICK
BY
ATTORNEYS

United States Patent Office 3,403,029
Patented Sept. 24, 1968

3,403,029
RECONSTITUTED BEER PROCESS USING
FRACTIONAL CRYSTALLIZATION
Emil A. Malick, Bartlesville, Okla., assignor to Phillips
Petroleum Company, a corporation of Delaware
Filed Nov. 6, 1964, Ser. No. 409,424
3 Claims. (Cl. 99—31)

ABSTRACT OF THE DISCLOSURE

Reconstituted beer is formed by fractionally crystallizing a beer product to form a concentrate containing some precipitate and a separate precipitate containing fraction, holding at least the concentrate at the temperature of the fractional crystallization process to allow additional precipitation to take place, heating at least the concentrate to allow redissolving of flavor bodies and the like from the precipitate, combining the heated concentrate and separate precipitate containing fraction, and separating precipitate from the combination.

---

This invention relates to a method and apparatus for making improved, reconstituted beer.

It is known to concentrate a fermented beer product by crystallization processes in which water, which constitutes about 90 weight percent of a normal beer, is removed by forming pure ice crystals at temperatures below the freezing point of water and then separating the ice crystals or pure water from the beer concentrate produced. The beer concentrate which represents only a fraction of the original volume of the fermented beer product can then be shipped more economically than whole beer, i.e., the finished product containing about 90 weight percent water, and then reconstituted by the addition of water and carbon dioxide at the point of destination for sale to the consumer. Heretofore there has always been a slight shift in the flavor of reconstituted beer from the original beer used to prepare the concentrate. In some cases the formation of higher molecular weight or agglomerated particles during the concentration process is achieved and these particles drop out of the beer and appear to take with them some flavor bodies the loss of which has a deleterious effect on the flavor of the reconstituted beer.

It has now been found that at least some of the desirable flavor bodies which are removed with the precipitation and agglomeration of particles during the concentration process can be redissolved in the concentrate without redissolving the undesirable particles thereby improving the flavor of the reconstituted beer.

More specifically, a reconstituted beer having superior taste characteristics is made by fractionally crystallizing a beer product to cause a precipitation and agglomeration therefrom of particles of dissolved impurities, suspended impurities, taste bodies and mixtures thereof and to remove therefrom 40 to 60 weight percent water. The particle and water phase is separated from the beer concentrate and the concentrate held at the temperature of operation of the fractional crystallization operation for a period of from 1 to 60 minutes to allow completion of precipitation and agglomeration reactions. The particle and water phases and the concentrate, after the above holding operation, are each separately heated to a temperature of from 50° to 100 ° F. and then mixed in this heated condition with one another and held in this mixed and heated state for from 1 to 30 minutes to allow the concentrate to redissolve the more readily soluble flavor bodies from the particles in the particle and water phase. The particles then remaining in the mixture are removed from the still heated mixture and the product is a reconstituted beer having superior taste characteristics. Although now preferred, it is not imperative that the particle and water phase be mixed with the concentrate if it is desired to take advantage of the relatively small volume of the concentrate for shipping purposes.

Accordingly, it is an object of this invention to provide a method and apparatus for producing a reconstituted beer of superior taste characteristics. It is another object of this invention to provide a reconstituted beer which has retained a greater proportion of flavor bodies than was heretofore possible.

Other aspects, objects and the several advantages of the invention will be readily apparent to those skilled in the art from the description, the drawing and the appended claims.

The drawing shows diagrammatically a system employing this invention.

More specifically, the drawing shows a beer product such as a fermented beer passing by 1 into chiller 2. Here the beer is cooled so that a slurry of ice crystals is formed in the beer concentrate or mother liquor. The solids content of the slurry should be as high as possible. A limiting factor will be the thickness of the slurry because if the slurry is too stiff it cannot be readily moved into and through the separation column. Ordinarily crystal slurries having greater than 70 percent solids cannot be efficiently processed and more frequently the solids content of the slurry is in the range of from about 40 to about 60 percent of the total slurry on a weight basis.

The slurry of ice crystals and mother liquor is passed from chiller 2 into separation column 3. The chiller 2 and the separation column 3 can be constructed as a single unit, as shown, or the units can be separated and connected with a conduit. In separation column 3, the ice ward, the mother liquor is displaced from the column into a body of water in the downstream end 4. This water is formed by melting the ice crystals by means of heating element 5, such as electrical resistance coil or a steamline. Water is removed from the downstream end 4 of column 3 through line 10 but the rate of water removal is restricted by motor valve 6 so that water is displayed by pulse unit 7 back into the advancing crystal mass. Check valve 8 in line 1 prevents backflow in that line on the forward stroke of pulse unit 7. Check valve 9 in line 10 prevents backflow of water through valve 6 on the backstroke of pulse unit 7. As the crystal mass is forced forward, the mother liquor is displaced from the column through filter section 11 from which it is withdrawn through line 12.

The mother liquor which contains most of the material precipitated in the chiller passes by 12 through check valve 13 into accumulator 14. Line 12 and accumulator 14 can be insulated and accumulator 14 can have separate cooling apparatus associated therewith in order to maintain the concentrate at the temperature of operation of separation column 3 for the time period of from 1 to 60 minutes, preferably 30 minutes. The rate of withdrawal of concentrate which has been held at the temperature of separation column 3 for the required amount of time is removed by 15 which removal is controlled by motor valve 16 which is operatively connected to liquid level controller 17 on accumulator 14. The concentrate passes through motor valve 16 to heater 18 in which it is heated to a temperature of from 50° to 100° F., preferably 70° F., and then passed by 19 to mixer 20. The water and precipitated and agglomerated particle phase passes by 10 to heater 21 the flow of which is controlled by motor valve 6 which is operatively connected to temperature recorder controller 22 which in turn is operatively connected to and responsive to the temperature in the downstream end 4 of separation column 3. The particle and water phase is heated by 21 to a temperature of from 50° to 100° F., preferably 70° F., and then passed by 23 to line 19 and ultimately into mixer 20. The mixture of the particle and water phase and the concentrate passes from mixer 20 by 24 to accumulator 25, the flow through 24 being controlled by motor valve 26 which is operatively connected to liquid level controller 27 on mixer 20. In accumulator 25 the heated mixture is held in a heated state for a period of from 1 to 30 minutes, preferably 15 minutes, to allow the concentrate to redissolve the more readily soluble flavor bodies present in or occluded by the particles from the particle and water phase.

The precise chemical and physical reactions which take place in separation column 3 to cause precipitation and agglomeration of particles and the actual composition of the particles precipitated is not known nor fully understood due to the very extremely complex materials and reactions involved in the making of beer. Therefore, although not desiring to be bound thereby, it appears that at least part of the particles precipitated and agglomerated and other materials occluded by said particles are composed of, in part, alpha-acids such as cohumulone, humulone, abhumulone and the like, beta-acids such as colupulone, lupulone, adlupulone and the like, soft and hard resins such as hop resins and the like, tannins, protein-tannin complexes, ash, lignins, dextrins such as achroodextrins, erythrodextrins and particularly higher molecular weight dextrins, polysaccharides from monosaccharides to nonasaccharides and various complex proteins. Although it is substantially unknown as to what constitutes flavor bodies and as to precisely what redissolves from the precipitated particles, the results of this invention appear to indicate that the undesirable materials once precipitated from the beer product by fractional crystallization tend to be less soluble in the concentrate than the more desirable flavor bodies which also precipitate or are occluded by the undesirable material precipitates. Thus, by the method of this invention the concentrate can be utilized to take back from the precipitated and agglomerated particles flavor bodies which would otherwise be lost and therefore deleteriously affect the taste of the reconstituted beer without redissolving at the same time substantial quantities of precipitated and agglomerated undesirable materials. Among those materials which it is thought that redissolve in the concentrate are the dextrins and particularly the low molecular weight dextrins, monosaccharides (glucose), disaccharides (maltose), trisaccharides and various quantities of higher saccharides up to possibly octasaccharides and nonasaccharides, and certain as yet unidentified proteins.

After the holding of the particle and water phase and concentrate mixture in the heated state for the desired time, the mixture is removed by 28, the flow of which is controlled by motor valve 29 which is operatively connected to liquid level controller 30 on accumulator 25. The mixture passes to and through filter 31 thereby removing those precipitated and agglomerated particles which were not redissolved in mixer 20 or accumulator 25. Generally, filtration can be achieved by any known filter such as cotton fibers mixed with about 1 weight percent of asbestos fibers and compressed wet to a thickness of from 5 to 6 centimeters or by a kieselguhr filter. The concentrate and water freed of particles, hereinafter referred to as dilute concentrate, passes from filter 31 by 32 to carbonation zone 33 wherein carbon dioxide is added in the desired amount. Ordinarily, about 1 volume of carbon dioxide is added per volume of dilute concentrate. This of course depends upon the concentration of carbon dioxide in the reconstituted beer since the finished product should contain from about 2.5 to about 2.8 volumes of carbon dioxide per volume of beer. Carbonation can be carried out by adding carbon dioxide through line 34 to carbonation zone 33 and/or by adding carbon dioxide to mixer 20.

The reconstituted beer passes from carbonation zone 33 by 35 to storage zone 36 and then by 37 to packaging zone 38 wherein the beer is placed in bottles or other containers for sale to the consumer.

It should be noted that according to the method of this invention a twofold advantage is achieved by contacting the beer concentrate with the particle and water phase separated therefrom. Not only are valuable and desirable flavor bodies recaptured by the concentrate from the particle and water phase but also the purified water is utilized to reconstitute the concentrate. Reconstitution with the purified water from the separation column in highly desirable since this water has the correct mineral content and also may contain trace amounts of alcohol and/or extract from the beer. Furthermore, such water will be of uniform characteristics and compatible with the concentrate since it was employed in the original brew and its use in reconstitution will not introduce new and objectionable characteristics into the reconstituted beer such as minerals, gases, sulfur, chlorine, solids and the like.

The method of concentrating beer according to this invention makes use of crystal purification columns such as are described in U.S. Patent Re. 23,810 to Schmidt and U.S. Patent 2,854,494 to R. W. Thomas. The crystallization process above described has many advantages over other known concentrating methods, which advantages appear to account, at least in part, for the results of this invention. One of these advantages is that the process is under positive pressure and is liquid full at all times and, for this reason, there are no interfaces of liquid and gas phases present. This means that there are no regions in the separation column where high relative velocities exist between liquid and gas phases, which might cause either vaporization (due to low pressures at the interface at high relative velocities) or shear and pickup of sheared liquid by the gas phase, all of which is of particular significance in the case of beer since retention of flavor bodies, particularly volatile ones, is of great importance. Another advantage is that the need for separate mechanical means for removing trapped or occluded beer from ice crystals formed is completely eliminated because the water is separated out as water and not as ice crystals. The elimination of ice crystals in turn eliminates the need for washing of ice crystals, such as may be required by other processes, in order to recover more of the occluded beer product. In addition to eliminating the operation itself, this in turn eliminates any dilution of the beer concentrate with such washings.

Finally, by employing the fractional crystallization process above, the lagering, i.e. aging, of the beer is accelerated significantly. One important effect of the lagering process is the clarifying of the beer by the precipitation and agglomeration of materials such as those discussed above. The particles which are removed during lagering are quite small and rather than each individual particle precipitating by itself it is necessary that these particles contact one another and agglomerate to form a larger particle agglomerate which is not affected by Brownian movements, convection and other mechanisms which tend to keep the individual particles from settling out. Thus, lagering not only is a time-dependent function but also is dependent upon the spacing of the particles in the beer. From this it can be seen that a very important factor in the lagering process is the relative spacing of the particles.

By the fractional crystallization process above a large amount of water is removed from the original beer and the concentrate formed has a greatly reduced volume. This volume reduction reduces the distance between the particles which must contact and agglomerate to settle out during lagering. Therefore, the probability of collision and agglomeration of these particles is increased exponentially due to the reduction in volume. For this reason the beer concentrate of this invention requires a significantly decreased time for lagering.

Generally, this invention can be applied to any beer product. Generally, however, it is preferred to treat beer from the fermentor, i.e. fermented beer, having an alcohol, i.e. ethanol, content of from 3 to 6.5 weight percent. The concentrate produced will contain from about 6 to 13 weight percent alcohol and the reconstituted beer after the addition of the particle and water phase will contain from 3 to 6.5, preferably 3 to 5, weight percent alcohol.

EXAMPLE

Beer from a brewing fermentation operation and containing 1.62 volume of carbon dioxide (STP) per volume of liquid is cooled in a chiller to form a slurry. The beer from the fermentor contains 3.8 weight percent alcohol and 4.2 weight per cent extract with the remainder water and carbon dioxide. The beer is cooled in the chiller to 23° F., thereby forming a slurry of ice crystals and mother liquor, the slurry having a solids content of about 50 percent. The slurry is passed through a crystal separation column wherein the ice crystals are melted and the resulting melt is withdrawn as purified water containing precipitated and agglomerated particles. Based upon 100 pounds of beer fed to the chiller, 50 pounds of water and precipitated and agglomerated particles and 50 pounds of mother liquor are withdrawn from the separation column. The mother liquor is passed to an accumulator and therein held at 24° F. for 30 minutes after which the mother liquor is withdrawn and heated to a temperature of 70° F. and then passed into a mixer preheated to a temperature of 70° F. The water and precipitated and agglomerated particle phase is withdrawn from the separation column, heated to a temperature of about 70° F. and added to the above preheated mixer. The concentrate and water and particle phase is mixed in the heated mixer for about 5 minutes and then passed to an accumulator which is preheated to a temperature of about 70° F. and held therein for about 10 minutes. At the end of 10 minutes, the heated mixture is withdrawn and passed through a kieselguhr filter which is also preheated to a temperature of about 70° F.

The carbon dioxide content of the concentration and water mixture from the filter is maintained at substantially the same amount as that present in the beer received from the fermentor by maintaining an equilibrium pressure of carbon dioxide in the mother in the separation column at about 10 p.s.i.g. The feed pressure to the chiller is maintained at about 75 p.s.i. above the equilibrium pressure of the carbon dioxide in the corresponding mother liquor. Thus the feed pressure to the chiller is about 85 p.s.i.g. The mother liquor outlet pressure from the column is maintained at about 25 p.s.i. above the corresponding chiller feed pressure so that the mother liquor discharged from the column is maintained at about 110 p.s.i.g. Thus, the pressure within the separation column is at all times maintained high enough to prevent evolution of gaseous carbon dioxide.

However, a slight loss of carbonation is realized due to the subsequent heating, mixing and hot filtering operations and therefore the concentrate-water mixture from the filter is carbonated by adding thereto one volume of carbon dioxide per volume of beer. The product is then metered and packaged for marketing.

Reasonable variations and modifications can be made, or followed, in view of the foregoing, without departing from the spirit or scope thereof.

I claim:
1. A method for making a reconstituted beer having improved taste characteristics comprising providing a fermented beer product, concentrating said beer product by cooling same to form a water crystal-mother liquor slurry, forcing said slurry into an elongated and confined separation zone, moving said crystals into a compact mass, advancing said compact mass into a body of liquid which is formed by melting the water crystals at a downstream portion of said separation zone, displacing a portion of said liquid back into said advancing crystal mass to remove occluded mother liquor therefrom, separating from an upstream portion of said separation zone concentrated mother liquor which is a beer concentrate, separating from a downstream portion of said separation zone water containing precipitated and agglomerated particles of dissolved impurities, suspended impurities, taste bodies and mixtures thereof, said water phase containing from 40 to 60 weight percent of the water present in the original fermented beer product, holding said concentrate at a temperature in the range of from about 19 to about 29° F. for from 1 to 60 minutes, after the holding operation heating said concentrate to a temperature of from 50° to 100° F., heating said water phase to a temperature of from 50° to 100° F., mixing the heated water phase with the heated concentrate, holding the mixture in the heated state for from 1 to 30 minutes to allow the concentrate to redissolve the more readily soluble flavor bodies from said particles, and removing the undissolved particles from said mixture to produce a reconstituted beer product having superior taste characteristics.

2. A method for making a reconstituted beer having improved taste characteristics comprising providing a beer product containing from 3 to 6.5 weight percent alcohol, concentrating said beer by cooling same to a temperature in the range of from 19° to 29° F. to form a water crystal-mother liquor slurry, forcing said slurry into an elongated and confined separation zone, moving said crystals into a compact mass, advancing said compact mass into a body of liquid which is formed by melting the water crystals at a downstream portion of said separation zone, displacing a portion of said liquid back into said advancing crystal mass to remove occluded mother liquor therefrom, separating from an upstream portion of said separation zone concentrated mother liquor which is a beer concentrate having an alcohol content of from 6 to 13 weight percent, separating from a downstream portion of said separation zone 50 weight percent of the water present in the original beer product and precipitated and agglomerated particles of dissolved impurities, suspended impurities, taste bodies and mixtures thereof, holding said concentrate at a temperature in the range of 19° to 29° F. for about 30 minutes, after the holding operation heating said concentrate to a temperature of about 70° F., heating said particle and water phase to a temperature of about 70° F., mixing the heated particle and water phase with the heated concentrate, holding the mixture at a temperature of about 70° F. for about 15 minutes, filtering the dissolved particles remaining in the mixture at a temperature of about 70° F. to produce a reconstituted beer product having superior taste characteristics.

3. The method of claim 2 wherein the filtered, reconstituted beer product has carbon dioxide added thereto in an amount suitable to produce a final beer product for marketing.

References Cited
UNITED STATES PATENTS 2,854,494  9/1958  Thomas _____ 99—205
3,128,188  4/1964  McIntire _____ 99—31

ALVIN E. TANENHOLTZ, *Primary Examiner.*

D. M. NAFF, *Assistant Examiner.*